US006766884B2

(12) United States Patent
Parsons et al.

(10) Patent No.: US 6,766,884 B2
(45) Date of Patent: Jul. 27, 2004

(54) WET BRAKE SYSTEM

(75) Inventors: Frank Parsons, North Geelong (AU); Vin C. Morley, Balcatta (AU); Stan Nowak, Balcatta (AU); Dorota Kieronska, Balcatta (AU)

(73) Assignee: Safe Effect Technologies International Limited, Melbourne (AU)

( * ) Notice: Subject to any disclaimer, the term of this patent is extended or adjusted under 35 U.S.C. 154(b) by 0 days.

(21) Appl. No.: 10/343,685

(22) PCT Filed: Nov. 29, 2000

(86) PCT No.: PCT/AU00/01471

§ 371 (c)(1),
(2), (4) Date: May 14, 2003

(87) PCT Pub. No.: WO02/10606

PCT Pub. Date: Feb. 7, 2002

(65) Prior Publication Data

US 2003/0173163 A1 Sep. 18, 2003

(30) Foreign Application Priority Data

Aug. 1, 2000  (AU) ................................. 0411

(51) Int. Cl.[7] ............................................. F16D 55/36
(52) U.S. Cl. .................. 188/71.5; 188/72.4; 188/264 E
(58) Field of Search .............................. 188/71.5, 72.3, 188/72.4, 264 E, 71.6, 18 A, 218 XL (56) References Cited

U.S. PATENT DOCUMENTS

| | | | | |
|---|---|---|---|---|
| 4,173,269 A | * | 11/1979 | Craig ......................... | 188/71.5 |
| 4,890,699 A | * | 1/1990 | Megginson et al. ...... | 188/18 A |
| 5,174,420 A | * | 12/1992 | DeWald et al. ......... | 188/264 E |
| 5,383,544 A | * | 1/1995 | Patel ........................ | 192/70.28 |
| 6,543,596 B2 | * | 4/2003 | Martin et al. .............. | 188/71.5 |

FOREIGN PATENT DOCUMENTS

EP    0128758    * 12/1984

* cited by examiner

Primary Examiner—Robert A. Siconolfi
Assistant Examiner—Melanie Torres
(74) Attorney, Agent, or Firm—Rothwell, Figg, Ernst & Manbeck (57) ABSTRACT

A brake system (10) for a rotating component (12), the brake system including a plurality of discs (14) coupled to said component (12) to rotate with said component (12) about an axis, each disc (14) having first and second opposite radial surfaces (22a, 22b), and a plurality of brake plates (16) fixed against rotation but linearly movable relative to said discs (14) parallel to said axis, each brake plate (16) having a braking surface (20). The discs (14) and brake plate (16) juxtaposed so that at least one of the radial surfaces (22) of each disc (14) is facing the braking surface (20) of a brake plate (16). At least one of the facing braking surface (20) and the radial surface (22) is provided with a plurality of grooves (24, 26). The grooves (24, 26) orientated to provide fluid flow paths across at least one of said facing braking surface (20) and radial surface (22). An actuator axially moves the brake plate (16) relative to the discs (14) between an engaged position where braking surface (20) is in engagement with a facing radial surface (22) and a disengaged position where said braking surface (20) is spaced from said facing radial surface (22). A sealed housing is provided in which the discs (14) and brake plates (16) reside, the housing containing a volume of liquid through which the discs (14) rotate.

27 Claims, 6 Drawing Sheets

WET BRAKE SYSTEM

FIELD OF THE INVENTION

The present invention relates to a wet brake system for braking the motion of a rotating component or device such as, for example, a wheel of a vehicle or a winch of a crane.

BACKGROUND OF THE INVENTION

Wet brake systems and components thereof are described in Applicant's International application Numbers PCT/AU92/00540, PCT/AU95/00529 and PCT/AU97/00500, the contents of which are incorporated herein by way of reference.

In broad terms, a wet brake system typically includes a disc fixed to rotate with a rotating component, a pair of brake pads disposed on opposite sides of the disc and a sealed housing containing the discs and the brake pads. The housing contains a volume of oil trough which the disc rotates. An equivalent dry brake system includes a disc and brake pads similar to the wet brake system but does not include an oil containing housing in which the disc and brake pads reside.

Benefits of a wet brake system over a dry brake system include a substantially reduced rate of wear of the brake pads and, because of the sealed housing, the ability to isolate contacting the surface of the disc and pads from foreign matter and debris that may otherwise adversely affect the performance or increase the rate of wear. Nevertheless, a substantial disadvantage of the wet brake system is that it has substantially reduced stopping power in comparison to a dry brake system having comparable brake pad area. This arises because of the presence of the oil in the housing which acts to reduce friction between the brake pads and discs.

SUMMARY OF THE INVENTION

The present invention was developed with a view to providing a wet brake system with improved stopping power.

According to the present invention there is provided a brake system for a rotating component, said brake system including at least:

a plurality of discs coupled to said component to rotate with said component about an axis, each disc having first and second opposite radial surfaces;

a plurality of brake means fixed against rotation but linearly movable relative to said discs parallel to said axis, each brake means having a braking surface;

said discs and brake means juxtaposed so that at least one of the radial surfaces of each disc is facing the braking surface of a braking means;

at least one of the facing braking surface aid the radial surface is provided with a plurality of grooves, said grooves orientated to provide fluid flow paths across said at least one of said facing braking surface and radial surface;

means for axially moving said braking means relative to said disc between an engaged position where said braking surface is in engagement with a facing radial surface and a disengaged position where said braking surface is spaced from said facing radial surface; and a sealed housing in which said discs and braking means reside, said housing containing a volume of liquid through which said discs rotate.

Preferably, said braking surface is provided in a plurality of spaced apart sectors, each sector having an inner circumferential face, an outer circumferential face and opposite first and second radial faces extending between said inner circumferential face and said outer circumferential face.

Preferably, said grooves are formed on the braking means and include one or more grooves that extend from the first radial face to the outer circumferential face of each sector.

Preferably, said grooves include one or more grooves that extend from the inner circumferential face to the outer circumferential face of each sector.

Preferably, said grooves include one or more grooves that extend from the inner circumferential face to the second radial face of each sector.

Preferably, there are four sectors, said sectors spaced evenly about said braking means wherein each sector extends for an arc angle of at least 45°.

Preferably, said braking spice extends over a cumulative arc angle of at least 180° about said brake means.

Preferably, said braking means is in the form of a brake disc and said braking surfaces are radial exposed surfaces of brake pads supported by said brake disc.

Preferably, said plurality of grooves include a plurality of grooves formed on each radial contacting surface facing a braking surface.

Preferably, each radial contacting surface facing a braking means is provided with a raised annular band having an inner circumferential edge and an outer circumferential edge and wherein the grooves on said radial contacting surface extend from the inner circumferential edge to the outer circumferential edge of the annular band.

Preferably, said brake system further includes at least one scraping means supported on at least one of said braking means for scraping liquid from a facing radial surface of a disc, said scraping means axially moveable between a first position in which said scraping means extends axially beyond the braking surface of said at least one braking means and a second position where said scraping means is retracted axially to lie substantially flush with or below said braking surface whereby when said braking means is moved toward said engaged position said scraping means engages said facing radial surface prior to said braking surface engaging said facing radial surface.

Preferably, said braking system further includes first bias means for biasing said scraping means toward said first position.

Preferably, said scraping means includes a contact face for contact with said facing radial surface, said contact face provided with one or more scraper grooves configured to provide one or more fluid communication paths across said contact face.

Preferably, a scraping means is provided between at least one set of mutually adjacent sectors. respectively.

BRIEF DESCRIPTION OF THE DRAWINGS

FIG. 2b is a view of section B—B of FIG. 2a;

FIG. 3b is a view of section 3—3 of FIG. 3a;

FIG. 4b is a view of section 4—4 of FIG. 4a;

FIG. 6b is a view of section 6—6 of FIG. 6a.

DETAILED DESCRIPTION OF THE PREFERRED EMBODIMENTS

Figure 1:
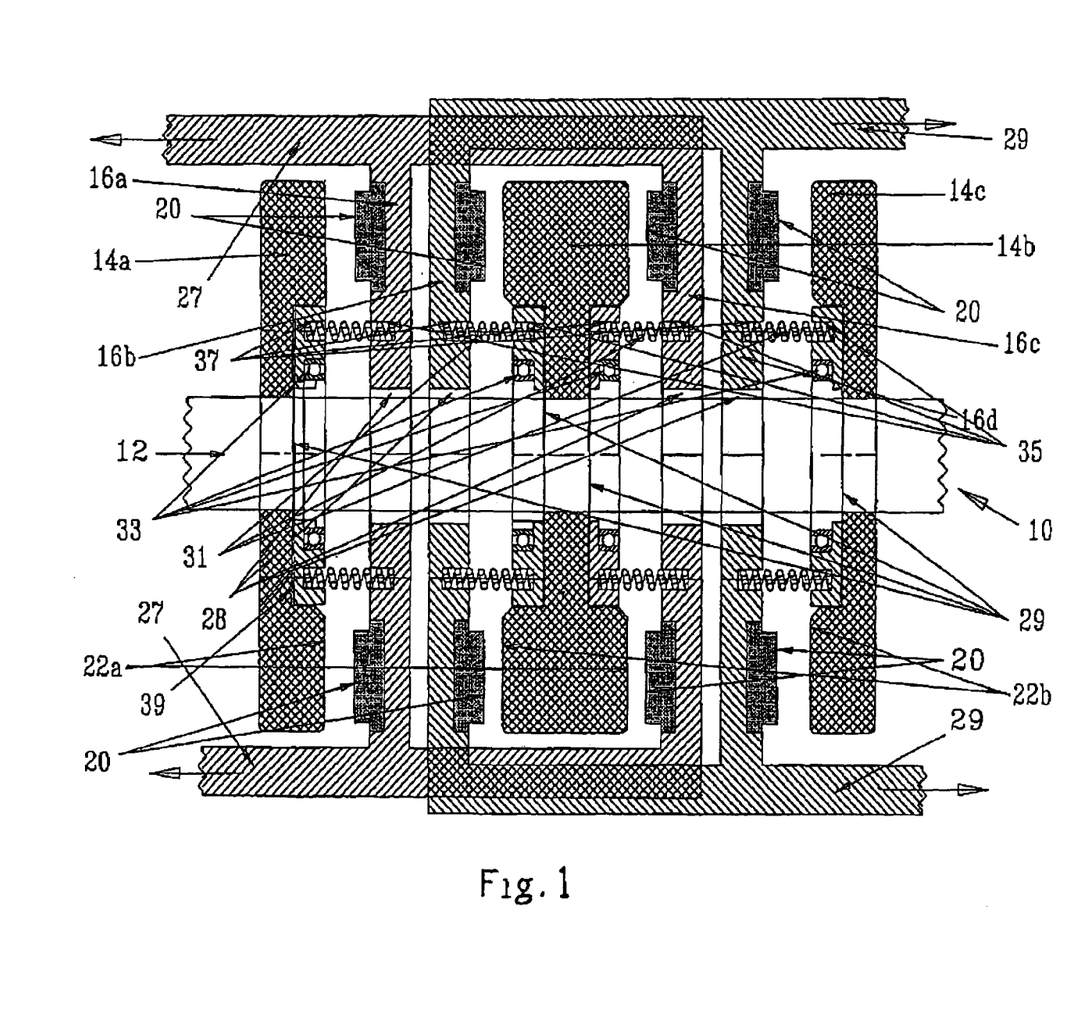
FIG. 1 is a schematic representation of an embodiment of a braking system.

With reference to the accompanying drawings and, in particular, FIG. 1, the braking system 10 for a rotating component such as an axle 12 includes a plurality of discs 14a, 14b and 14c (hereinafter referred to in general as "discs 14") each of which are coupled to and rotate with the axle 12 and, a plurality of brake means in the form of plates 16a, 16b, 16c and 16d (hereinafter referred to in general as "plates 16") which are fixed against rotation but are able to slide linearly relative to the discs 14 parallel to an axis 18 of rotation of the axle 12. Each plate 16 is provided with a braking surface 20 (see also FIGS. 2a and 2b). As is most apparent from FIG. 2a, the braking surface 20 is divided into a plurality of spaced apart sectors.

Each disc 14 has opposite radial faces 22a end 22b (hereinafter referred to in general as "radial surfaces 22"). The discs 14 and plates 16 are Juxtaposed so that at least one of the radial surfaces 22 of each disc 14 is in facing relationship with the braking surface 20 of a plate 16. For example, with reference to FIG. 1, the radial surface 22a of disc 14a is in facing relationship with the braking surface 20 df plate 16a and, radial surfaces 22a and 22b of disc 14b face the braking surfaces 20 of plates 16c and 16b respectively.

Figure 2A:
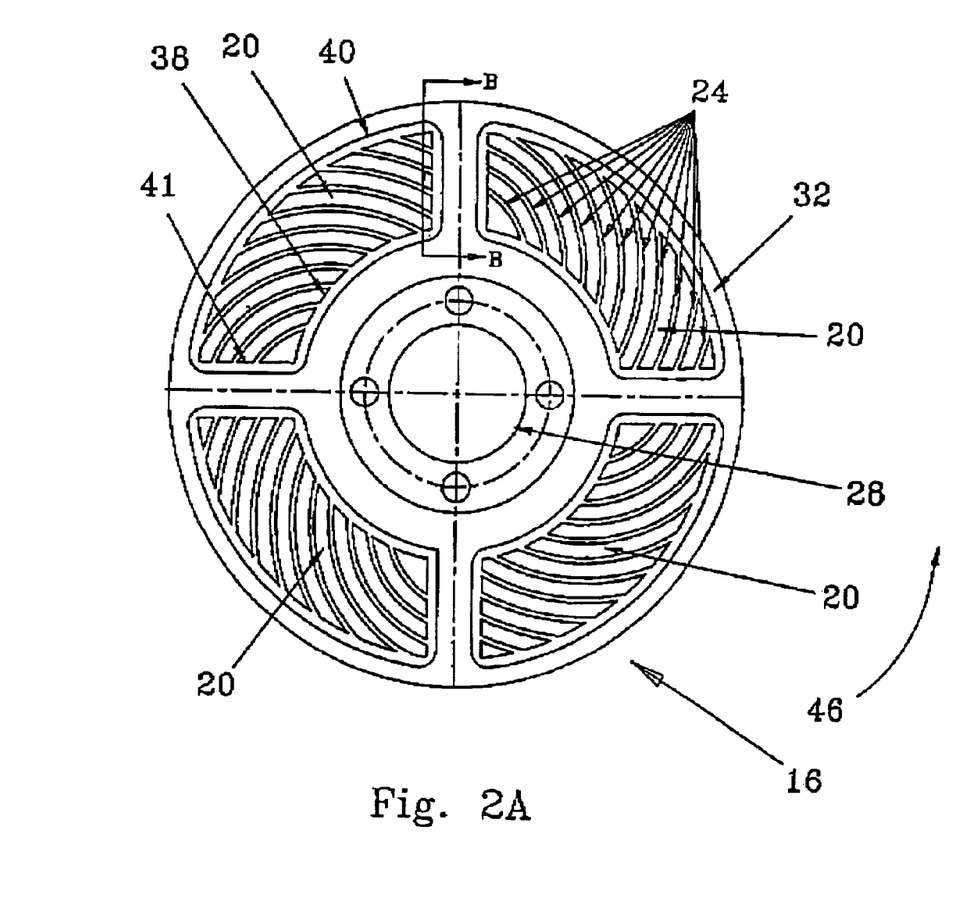
FIG. 2a is a plan view of a braking means incorporated in the system depicted in FIG. 1.
Figure 2B:
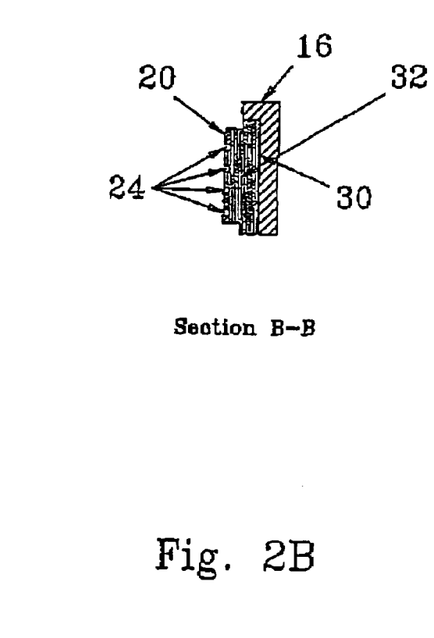
Figure 3A:
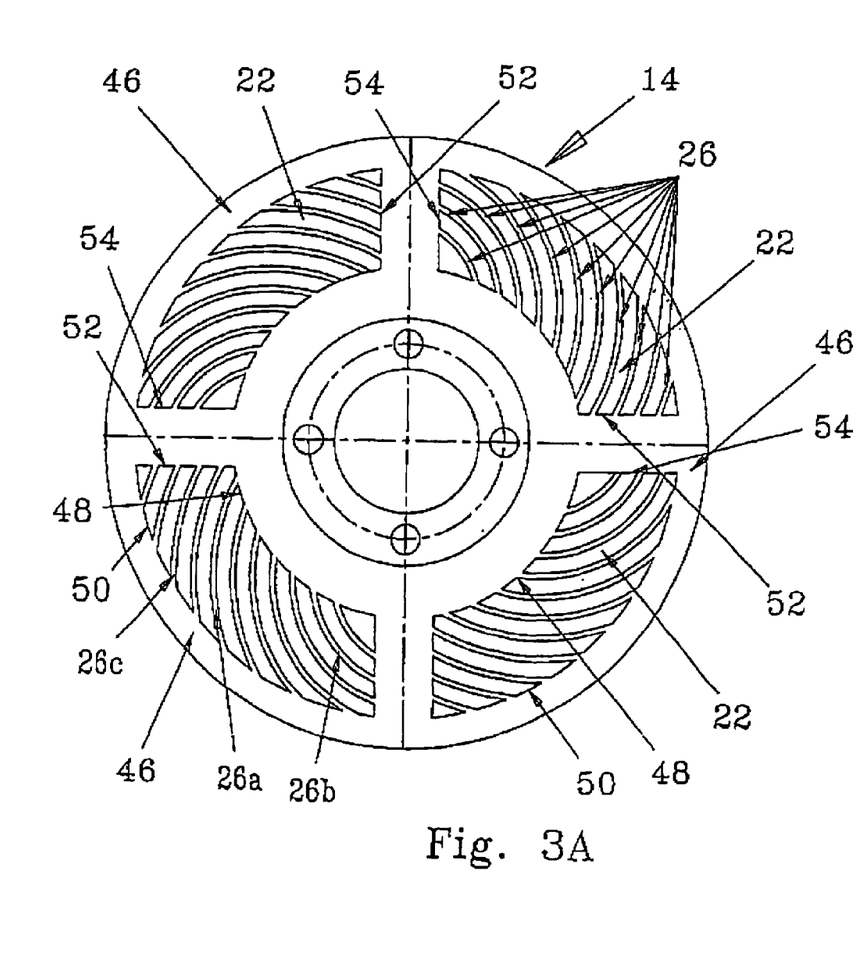
FIG. 3a is a plan view of an embodiment of a disc incorporated in the system depicted in FIG. 1.

At least one of the mutually facing braking surfaces 20 and radial surfaces 22 is provided with a plurality of grooves. FIG. 2a depicts grooves 24 on braking surface 20 of a plate 16 while FIG. 3a depicts grooves 26 on radial surface 22 of a disc 14. The grooves 24 and 26 are orientated to provide fluid flow paths across the braking surface 20 and radial surface 22 respectively, In this context, and throughout this specification and the claims, the word "across" is to be construed to mean extending between two spaced apart points on a peripheral edge of the surface in question. For example, to say that a groove 24 forms a fluid flow path across braking suffice 20 means that the groove 24 forms a fluid flow path at extends between two spaced apart points on a peripheral edge bounding the braking surface 20. The word "across" is not intended to be limited to mean only from "side to side".

Means in the form of a hydraulic actuator (not shown) is provided for axially moving the plates 16 relative to the discs 14 between an engaged position where the braking Surfaces 20 of each of the plates 16 engages respective facing radial surfaces 22 of discs 14 and a disengaged position (shown in FIG. 1) where the braking surfaces 20 are spaced from respective facing radial surfaces 22. To this end plates 16a and 16c are connected by rods 27 that extend through one side of a housing (not shown) while plates 16b and 16d are connected by rods 29 that extend through an opposite side of the housing. It is envisaged that the ends of rods 27 would be connected together outside of the housing for example by coupling to a common plate and that a hydraulic actuator such as a piston would operate between the outside of the housing and the plate to pull on the rods 27 and thus axially pull the plates 16a and 16c into contact with radial surfaces 22a of discs 14a and 14b respectively, Similarly, the rods 29 would be coupled together by a plate or like structure with a piston operating between that and the outside of the housing to pull the rods 29 and thus the plates 16b and 16d to engage the surfaces 22b of discs 14b and 14c.

In addition to the hydraulic actuator (not shown) for moving the plates 16 into engagement with the discs 14, the means for axially moving the plates 16 relative to the discs 14 also includes a mechanism for separating discs and pads after a braking operation, The mechanism includes a plurality of bias means in the form of coil springs 31 and bearing housings 33. Each spring 31 has one end that sits within a blind hole 35 formed in the side of a plate 16 that contains a braking surface 20. An opposite end of each spring 31 is seated within respective blind holes 37 provided in tie bearing housings 33. Bearing housings 33 in turn seat within recesses 39 formed in the discs 14. The bearing housings 33 provide torque decoupling between the rotating discs 14 and the springs 31. It is envisaged that the springs 31 would be provided with some degree of pre-load. When the hydraulic actuator is operated to bring the plates 16 into engagement with the discs 14 (ie to effect braking) springs 31 are further compressed, However, when the hydraulic actuator is released (in a vehicle, akin to taking one's foot off the brake pedal) the springs 31 act to separate the plates 16 from the discs 14.

The system 10 also includes a sealed housing (not shown) containing the discs 14 and plates 16. The housing holds a volume of liquid typically oil through which the discs 14 rotate as the axle 12 turns.

The configuration of the plates 16 and braking surfaces 20 is explained in greater detail with reference to FIGS. 1, 2a, 2b, 4a and 4b. Each plate 16 is circular in shape with a central hole 28 through which the axle 12 passes with circumferential clearance. The plate 16 is provided with a plurality of arcuate recesses 30 for seating respective brake pads 32. The brake pads 32 are in the form of a block or element of friction material in the general shape of a sector of an annulus. The cumulative exposed radial surface of the brake pads 32 on one side of a plate 16 constitutes the braking surface 20 of the plate 16. The braking surface 20 of any sector has a first lateral (or inner circumferential) edge 38, a second lateral (or outer circumferential) edge 40 and opposite radial (or trailing and leading) edges 42 and 44 that extend in a radial direction between the edges 38 and 40. In the present embodiment, there are four brake pads 32 (ie the braking surface 20 is made up of four separate sectors) that are evenly spaced about the plate 16. Each pad 32 is locked or otherwise attached in a corresponding recess 30 of the plate 16.

Figure 4A:
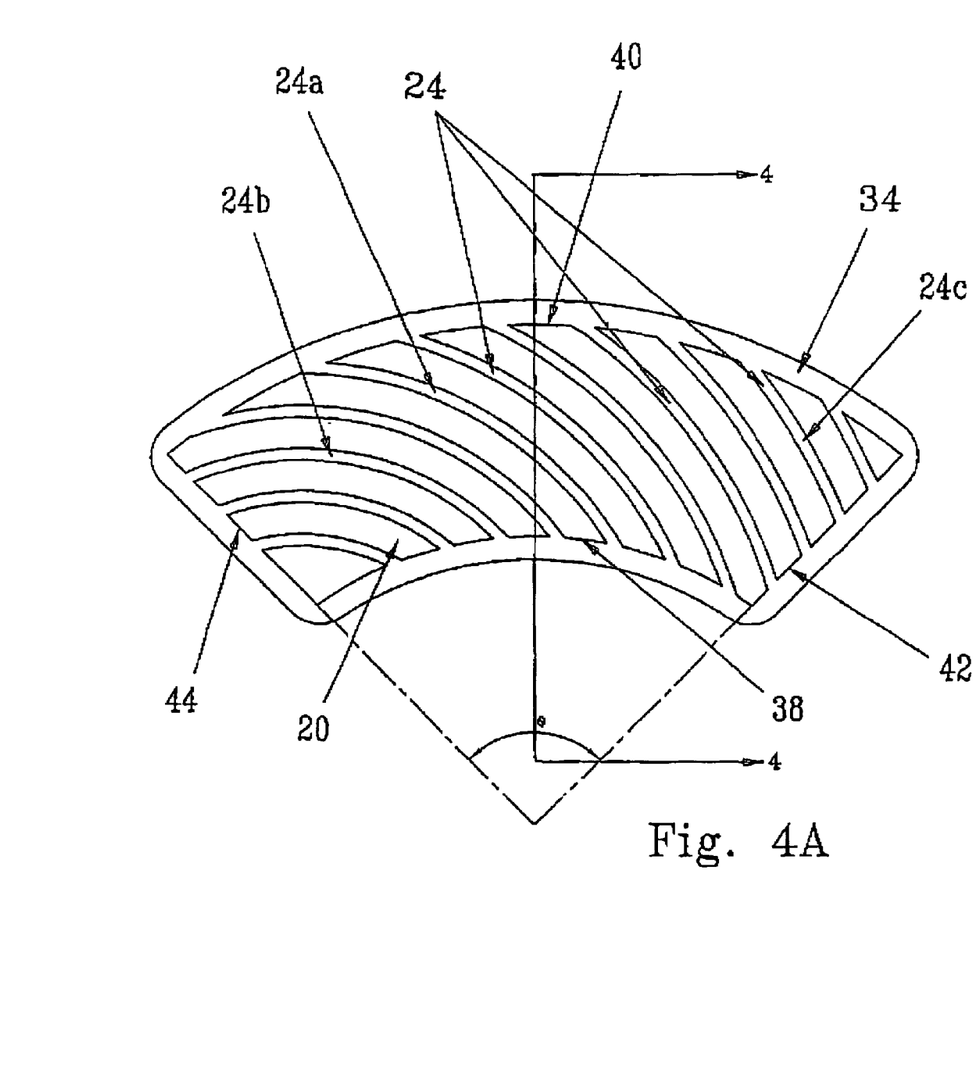
FIG. 4a is a plan view of a brake pad incorporated in the system depicted in FIG. 1.
Figure 4B:
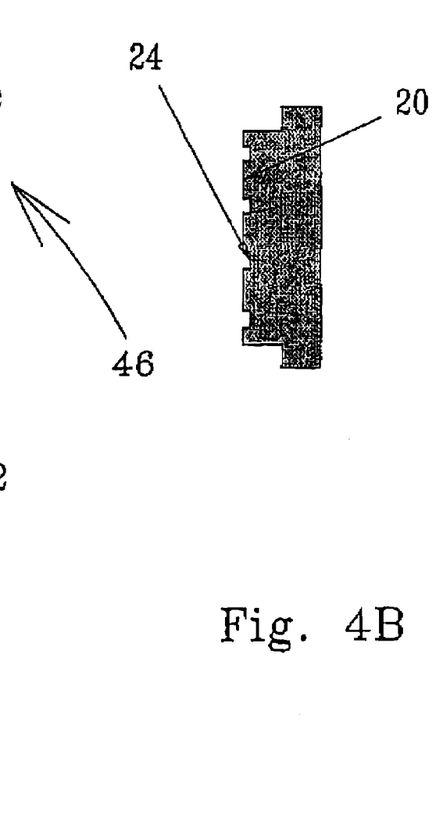

As shown in FIG. 4a, the braking surface 20 of each individual brake pad or sector extends for an arc angle θ of approximately 70 to 80°, thus the cumulative braking surface 20 of the disc 16 extends from an arc angle of between 280 to 320° about the plate 16. Accordingly, when the discs 14 and plates 16 are in engagement, the braking surface 20 contacts the facing radial surface 22 over an angle of over 180° and more particularly over an angle of approximately 280 to 320°.

It is envisaged in another embodiment that the braking surface 20 can extend for a continuous annulus on the plate 16. The brake pad being in the form of an annular ring.

The grooves 24 are of general spiroidal configuration. At least one of the grooves 24, (eg groove 24a in FIG. 4a) extends between the edge 38 and edge 40. At least one other groove, eg groove 24b, extends from the edge 38 to the edge 44, and at least one further groove 24c, extends from the edge 42 to the edge 40.

Figure 3B:
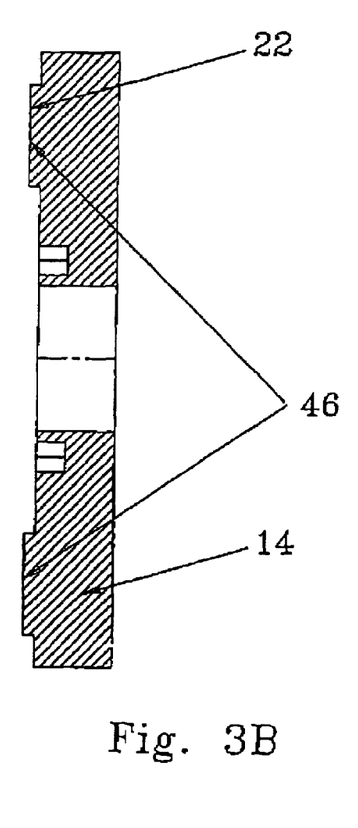

As mentioned above, the radial surfaces 22 of the disc 14 can also be provided wit a plurality of grooves 26. As shown in FIGS. 3a and 3b, the radial surfaces 22 can be formed as a series of raised sectors 46 disposed about the disc 14. Each sector 46 has a first (or inner circumferential edge 48, a second (or outer circumferential) edge 50, and opposite first and second radial (or trailing and leading) edges 52 and 54 that extend between the edges 48 and 50.

The configuration of the grooves 26 on the radial face 22 is, in this embodiment, substantially the same as the configuration 24 on the braking surfaces 20. There is at least one groove 26a that extends from edge 48 to edge 50, at least one groove 26b that extends from edge 48 to the edge 54 and at least one groove 26c that extends from edge 52 to the edge 50.

Figure 5:
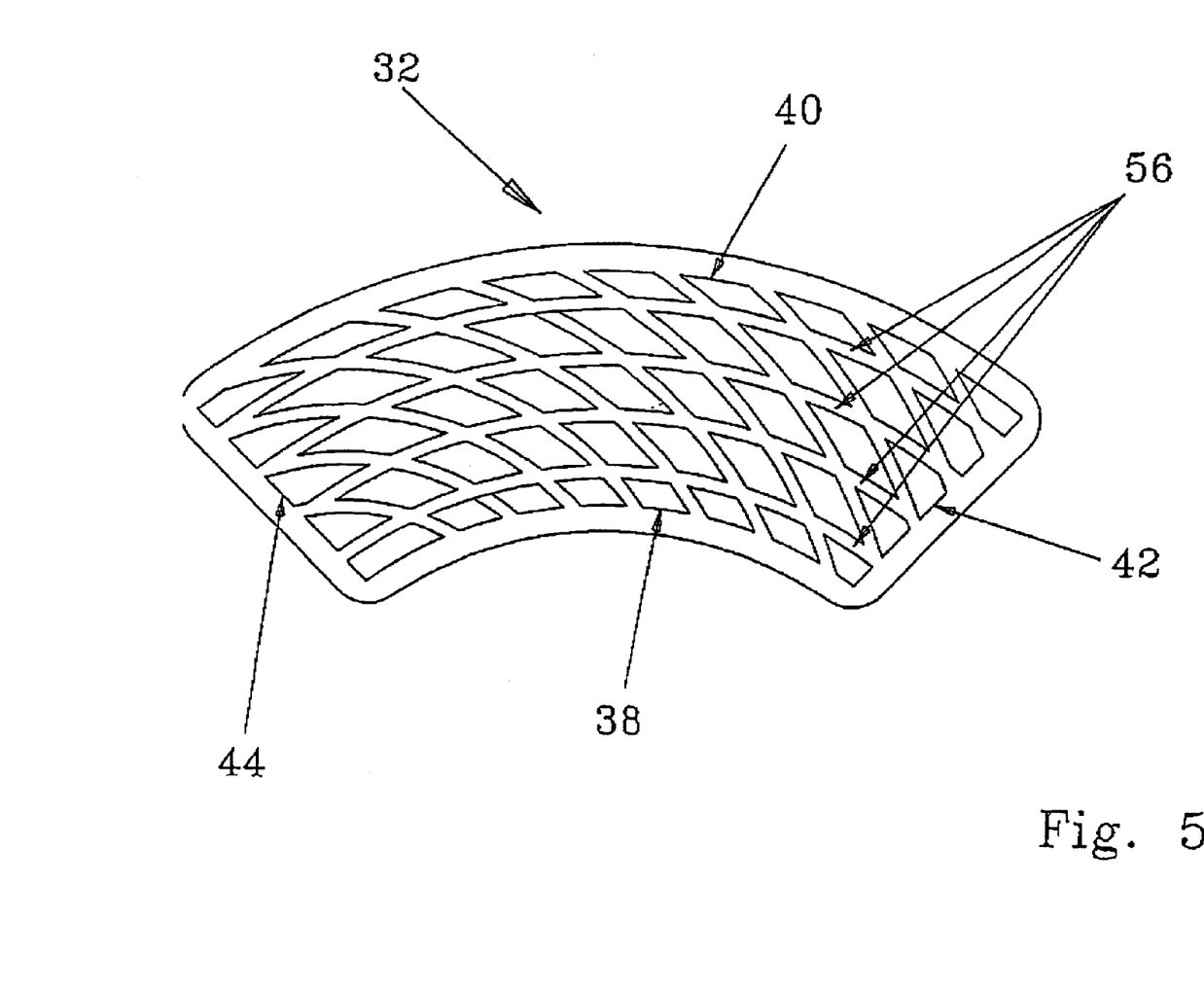
FIG. 5 is a plan view of a second embodiment of a brake pad incorporated in the system depicted in FIG. 1.

FIG. 5 depicts an alternate configuration of grooves for a brake pad 32. The configuration of grooves in FIG. 5 differs from that depicted in FIG. 4 by the addition of four circumferential grooves 56 that extend between opposite radial edges 42 and 44, Similar circumferential grooves can be applied to the radial surface 22 of the discs 14.

Figure 6A:
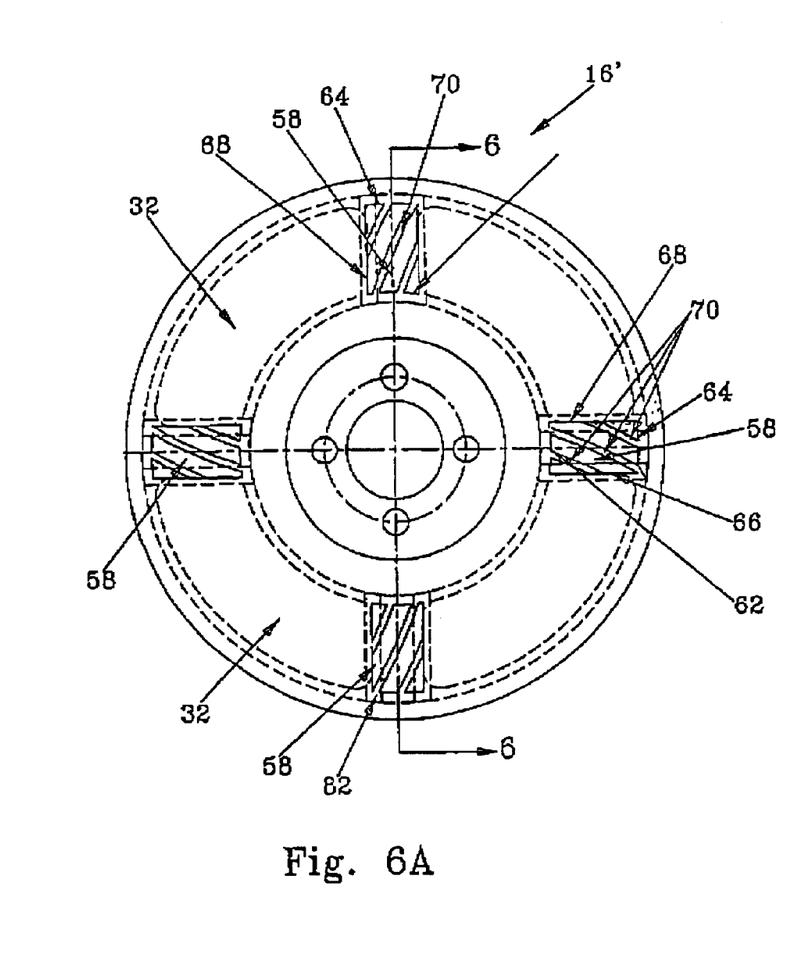
FIG. 6a is a plane view of a second embodiment of a braking means incorporated a scraper.
Figure 6B:
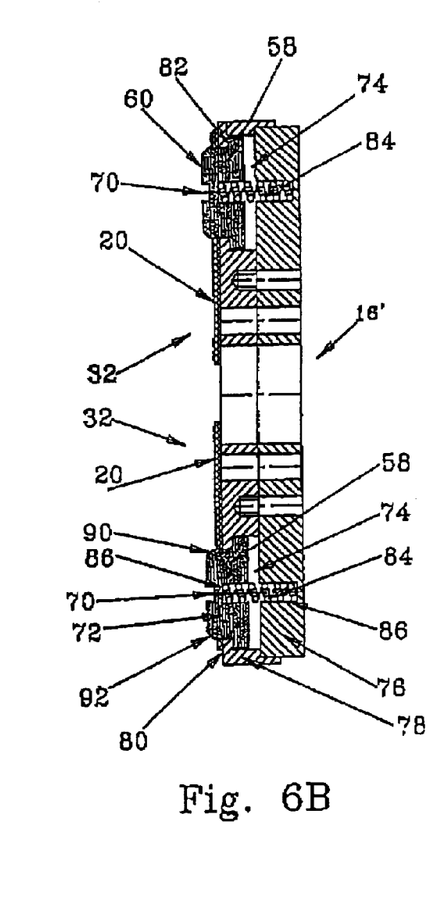

FIGS. 6a and 6b depict a further embodiment of plate 16'. The plate 16' differs in substance from the plate 16 depicted in FIGS. 2a and 2b by the inclusion of scrapers or wipers 58. The scrapers 58 are supported in the plate 16' and are axially moveable between a first position (depicted in FIG. 6b) where the scrapers 58 extend axially beyond the braking surface and a second position where the scrapers 58 lie flush with or below the braking surface 20.

Each of the scrapers or wipers 58 has a substantially planar contact face 60 for face to face contact with facing radial surface 22. Contact face 60 has a peripheral surface which is made up of a first lateral (or inner circumferential) edge 62, a second lateral (or outer circumferential) edge 64, and opposite first and second radial (Or trailing and leading) edges 66 and 68 extending between the edges 82 and 64. Grooves 70 are formed on the contact face 60 to provide a fluid flow path between respective pairs of spaced apart points on the peripheral edge of the contact face 60. In this particular embodiment, one of the grooves 70 extends between and opens onto respective points on the edges 64 and 68 of the contact face 20; another groove 70 extends between and opens onto respective points on edges 64 and 82, and another onto respective points on edges 66 and 62.

Each of the scrapers 58 is in the form of a generally rectangular shaped block 72 of a wear resistant and preferably self-lubricating, material such as PTFE or PTFE impregnated with boron or manganese bronze. Each block 72 is housed within a respective cavity 74 formed between a back plate 76 and a front plate 78 which are coupled together to form the plate 16'. The front plate 78 is provided with a plurality of apertures 80 through which the contact face 60 of respective scrapers 58 can extend. The width and breadth of the apertures 80 are smaller than the corresponding dimensions of the cavities 74. Each block 72 is provided with a laterally extending peripheral skirt 82 which is configured and dimensioned so as to be able to slide axially within cavity 74 but unable to pass through aperture 80. In this way, the scrapers 58 are retained to move axially within the cavities 74 of the plate 16.

Bias means in the form of one or more springs 84 are provided for biasing the scrapers 58 axially outwardly to a first position where their contact surface 60 extends axially beyond the braking surface 20. Opposite ends of each spring are retained within blind holes 86 and 38 formed in the back plate 76 and block 72 respectively. The springs 84 are provided with a degree of pre-load in order to hold the scrapers 58 axially outwardly to the maximum extent.

As seen in FIG. 6B, each of the scrapers 58 is provided with opposite radially extending bevelled surfaces 90 and 92. Bevelled surface 90 slopes away from the edge 64 and bevelled edge 92 slopes away from opposite edge 62. Similar bevelled edges are provided that slope away from edges 66 and 68 of the contact face 60 of the scrapers 58.

Now that the embodiments of the present invention have been described in detail, it would be apparent to those skilled in the relevant arts that numerous modifications and variations may be made without departing from the basic inventive concepts. For example, in FIG. 1, it is noted that only the centre disc 14b is acted upon on opposite radial surfaces 22a and 22b by respective braking surfaces 20. However, the system 10 can be re-configured so that both discs 14a and 14c are likewise acted upon on opposite sides by corresponding brake surfaces. Further, FIG. 1 depicts a system comprising three discs 14. However, the system may operate with any number of two or more discs 14. Also it is to be understood however that it is not an absolute requirement for the grooves to be provided on both the bring surface 20 and the radial surfaces 22.

All such modifications and variations are deemed to be within the scope of the present invention the nature of which is to be determined from the above description and the appended claims.

What is claimed is:

1. A brake system for a rotating component, said brake system comprising:

a plurality of discs coupled to said component to rotate with said component about an axis, each disc having first and second opposite radial surfaces;

a plurality of brake means fixed against rotation but linearly movable relative to said discs parallel to said axis, each brake means having a braking surface;

said discs and brake means juxtaposed so that at least one of the radial surfaces of each disc is facing the braking surface of a brake means;

at least one of the facing braking surface and the radial surface being provided with a plurality of grooves, said grooves oriented to provide fluid flow paths across said at least one of said facing braking surface and radial surface;

a mechanism for axially moving said brake means relative to said disc between an engaged position where said braking surface is in engagement with a facing radial surface and a disengaged position where said braking surface is spaced from said facing radial surface;

a sealed housing in which said discs and brake means reside, said housing containing a volume of liquid through which said discs rotate; and at least one scraper supported on at least one of said brake means for scraping liquid from a facing radial surface of a disc, said scraper being axially moveable between a first position in which said scraper extends axially beyond said braking surface of said brake means, and a second position where said scraper is retracted axially to lie at least substantially flush with or below said braking surface, whereby said scraper engages said facing radial surface prior to said braking surface engaging said facing radial surface when said brake means is moved toward said engaged position from said disengaged position.

2. A brake system according to claim 1, wherein said grooves follow a spiroidal path.

3. A brake system according to claim 2 further comprising a first bias means for biasing said scraper toward said first position.

4. A brake system according to claim 3 wherein, said scraper comprises a contact face for contact with said facing radial surface, said contact face provided with one or more scraper grooves configured to provide one or more fluid communication paths across said contact face.

5. A brake system according to claim 1 wherein separate brake means are provided on opposite sides of at least one disc so that the first and second contact surfaces of said at least one disc can each be engaged by the braking surface of an adjacent brake means.

6. A brake system according to claim 1 further comprising respective bias devices acting between said brake means and said discs to urge said braking surfaces and said facing radial surfaces toward said disengaged position.

7. A brake system according to claim 6 further comprising respective bearings seated in said brake means for rotationally decoupling said brake means from said rotating component and wherein said respective bias devices are coupled between the bearing of each brake means and a corresponding facing radial surface.

8. A brake system according to claim 1 wherein, said braking surface is provided in a plurality of spaced apart sectors, each sector having an inner circumferential face, an outer circumferential face and opposite first and second radial faces extending between said inner circumferential face and said outer circumferential face.

9. A brake system according to claim 8 wherein, said grooves are formed on the brake means and include one or more grooves that extend from the first radial face to the outer circumferential face of each sector.

10. A brake system according to claim 9 wherein, said grooves include one or more grooves that extend from the inner circumferential face to the outer circumferential face of each sector.

11. A brake system according to claim 10 wherein, said grooves include one or more grooves that extend from the inner circumferential face to the second radial face of each sector.

12. A brake system according to claim 8 wherein, there are four sectors, said sectors spaced evenly about said brake means wherein each sector extends for an arc angle of at least 45°.

13. A brake system according to claim 1 wherein, said braking surface extends over a cumulative arc angle of at least 180° about said brake means.

14. A brake system according to claim 8 wherein, said brake means is in the form of a brake disc end said braking surfaces are radial exposed surfaces of brake pads supported by said brake disc.

15. A brake system according to claim 1 wherein, said plurality of grooves include a plurality of grooves formed on each radial contacting surface facing a braking surface.

16. A brake system according to claim 15 wherein, each radial contacting surface facing a brake means is provided with a raised annular band having an inner circumferential edge and an outer circumferential edge and wherein the grooves on said radial contacting surface extend from the inner circumferential edge to the outer circumferential edge of the annular band.

17. A brake system for a rotating component, said brake system comprising:
a plurality of discs coupled to said component to rotate with said component about an axis, each disc having first and second opposite radial surfaces;
a plurality of brake elements fixed against rotation but linearly movable relative to said discs parallel to said axis, each brake element having a braking surface;
said discs and brake elements juxtaposed so that at least one of the radial surfaces of each disc is facing the braking surface of a brake element;

at least one of the facing braking surface and the radial surface being provided with a plurality of grooves, said grooves oriented to provide fluid flow paths across said at least one of said facing braking surface and radial surface;
a mechanism for axially moving said brake elements relative to said disc between an engaged position where said braking surface is in engagement with a facing radial surface and a disengaged position where said braking surface is spaced from said facing radial surface;
a sealed housing in which said discs and brake elements reside, said housing containing a volume of liquid through which said discs rotate;
respective bias devices acting between said braking elements and said discs to urge said braking surfaces and said facing radial surfaces toward said disengaged position; and
respective bearings seated in said brake elements for rotationally decoupling said brake elements from said rotating component and wherein said respective bias devices are coupled between the bearing of each brake element and a corresponding facing radial surface.

18. A brake system according to claim 17, wherein said grooves follow a spiroidal path.

19. A brake system according to claim 17, further comprising at least one scraper supported on at least one of said brake element for scraping liquid from a facing radial surface of a disc, said scraper being axially moveable between a first position in which said scraper extends axially beyond said braking surface of said brake element, and a second position where said scraper is retracted axially to lie at least substantially flush with or below said braking surface, whereby said scraper engages said facing radial surface prior to said braking surface engaging said facing radial surface when said brake element is moved toward said engaged position from said disengaged position.

20. A brake system according to claim 19, further comprising a first bias device for biasing said scraper toward said first position.

21. A brake system according to claim 20, wherein said scraper comprises a contact face for contact with said facing radial surface, said contact face provided with one or more scraper grooves configured to provide one or more fluid communication paths across said contact face.

22. A brake system according to claim 17, wherein separate brake elements are provided on opposite sides of at least one disc so that the first and second contact surfaces of said at least one disc can each be engaged by the braking surface of an adjacent brake element.

23. A brake system for a rotating component, said brake system comprising:
a plurality of discs coupled to said component to rotate with said component about an axis, each disc having first and second opposite radial surfaces;
a plurality of brake elements fixed against rotation but linearly movable relative to said discs parallel to said axis, each brake element having a braking surface;
said discs and brake elements juxtaposed so that at least one of the radial surfaces of each disc is facing the braking surface of a brake element;
said radial surfaces being provided with a plurality of grooves, said grooves oriented to provide fluid flow paths across said radial surfaces;
a mechanism for axially moving said brake elements relative to said disc between an engaged position where said braking surface is in engagement with a facing radial surface and a disengaged position where said braking surface is spaced from said facing radial surface;

respective bias devices acting between said braking elements and said discs to urge said braking surfaces and said facing radial surfaces toward said disengaged position; and a sealed housing in which said discs and brake elements reside, said housing containing a volume of liquid through which said discs rotate.

24. A brake system according to claim 23, further comprising at least one scraper supported on at least one of said brake element for scraping liquid from a facing radial surface of a disc, said scraper being axially moveable between a first position in which said scraper extends axially beyond said braking surface of said brake element, and a second position where said scraper is retracted axially to lie at least substantially flush with or below said braking surface, whereby said scraper engages said facing radial surface prior to said braking surface engaging said facing radial surface when said brake element is moved toward said engaged position from said disengaged position.

25. A brake system according to claim 24, further comprising a scraper bias device for biasing said scraper toward said first position.

26. A brake system according to claim 24, wherein said scraper comprises a contact face for contact with said facing radial surface, said contact face provided with one or more scraper grooves configured to provide one or more fluid communication paths across said contact face.

27. A brake system according to claim 23, wherein said grooves follow a spiroidal path.

* * * * *